(12) United States Patent
Trahan (10) Patent No.: US 10,711,176 B2
(45) Date of Patent: Jul. 14, 2020

(54) METHOD, PROCESS, APPARATUS AND CHEMICALS TO PRODUCE AND INJECT PARAFFIN TREATING COMPOUNDS

(71) Applicant: David O. Trahan, Lafayette, LA (US)

(72) Inventor: David O. Trahan, Lafayette, LA (US)

( * ) Notice: Subject to any disclaimer, the term of this patent is extended or adjusted under 35 U.S.C. 154(b) by 0 days.

(21) Appl. No.: 16/592,052

(22) Filed: Oct. 3, 2019

(65) Prior Publication Data

US 2020/0032124 A1 Jan. 30, 2020

Related U.S. Application Data

(60) Provisional application No. 62/740,787, filed on Oct. 3, 2018.

(51) Int. Cl.
| | | |
|---|---|---|
| *C09K 8/524* | (2006.01) | |
| *B01F 7/00* | (2006.01) | |
| *B01F 15/00* | (2006.01) | |
| *B01F 15/02* | (2006.01) | |

(52) U.S. Cl.
CPC ............ *C09K 8/524* (2013.01); *B01F 7/0025* (2013.01); *B01F 7/00725* (2013.01); *B01F 15/00467* (2013.01); *B01F 15/0243* (2013.01); *B01F 2215/0067* (2013.01); *Y10S 507/931* (2013.01)

(58) Field of Classification Search
CPC .. C09K 8/524; B01F 7/0025; B01F 15/00467; B01F 15/0243; B01F 7/00725; B01F 2215/0067; Y10S 507/931
See application file for complete search history.

(56) References Cited

U.S. PATENT DOCUMENTS

| | | | | | |
|---|---|---|---|---|---|
| 1,476,747 | A | * | 12/1923 | Wolever | E21B 37/00 166/267 |
| 2,139,595 | A | * | 12/1938 | Lerch | C09K 8/524 166/304 |
| 2,300,348 | A | * | 10/1942 | Dana | C09K 8/524 166/302 |

(Continued)

OTHER PUBLICATIONS

Derwent Abstracts: DERWENTACC—No: 2017-82819D of Patent document, CN 206688483 U Dec. 1, 2017, 3 pages. (Year: 2017).*

(Continued)

*Primary Examiner* — Tony G Soohoo
(74) *Attorney, Agent, or Firm* — Matthews, Lawson, McCutcheon & Joseph, PLLC (57) ABSTRACT

The present invention is a device and a method that combines a carbon disulfide-releasing chemical with a low pH organic or inorganic acid to produce a carbon disulfide-containing fluid at or near the point of injection that minimizes or eliminates the possible exposure of carbon disulfide to workers and the environment. In one particular embodiment a positive displacement injection pump injects the carbon disulfide-containing fluid into a crude oil system for treating crude oil transmission lines and in downhole tubulars to remove paraffin deposits. The device uses a unique in-line motion mixer to mix two fluids. The device is electronically controlled locally and remotely with the system operating data displayed locally and transmitted remotely. The paraffin treating carbon disulfide-containing fluid and supplemental chemicals dissolve, disperse and remove paraffin deposits.

17 Claims, 5 Drawing Sheets

(56) References Cited

U.S. PATENT DOCUMENTS

| | | | | |
|---|---|---|---|---|
| 2,411,044 A * | 11/1946 | Landrum | C09K 8/524 | 134/8 |
| 2,451,545 A * | 10/1948 | Ferris | C10G 73/06 | 208/33 |
| 2,556,177 A * | 6/1951 | Gamson | C01B 32/70 | 423/443 |
| 3,241,614 A * | 3/1966 | Bertness | C09K 8/524 | 166/304 |
| 3,375,192 A * | 3/1968 | Rowlinson | C09K 8/524 | 507/203 |
| 3,402,770 A * | 9/1968 | Messenger | C09K 8/524 | 166/303 |
| 3,481,870 A * | 12/1969 | Cheng | C09K 8/524 | 507/90 |
| 3,563,315 A * | 2/1971 | Claytor, Jr. | C09K 8/54 | 166/304 |
| 3,681,230 A * | 8/1972 | Eagen et al. | C10G 73/06 | 208/33 |
| 3,700,594 A * | 10/1972 | Lissant | C09K 8/524 | 507/261 |
| 3,724,552 A * | 4/1973 | Snavely, Jr. | C09K 8/524 | 166/304 |
| 3,732,166 A * | 5/1973 | Lissant | C09K 8/524 | 166/304 |
| 3,876,753 A * | 4/1975 | Manganaro | B01J 12/00 | 423/443 |
| 4,078,045 A * | 3/1978 | Nakayama | B01J 27/04 | 423/416 |
| 4,756,888 A * | 7/1988 | Gallup | C09K 8/528 | 203/7 |
| 5,053,149 A * | 10/1991 | McElligott, Jr. | C09K 8/524 | 166/300 |
| 5,076,358 A * | 12/1991 | Kissel | C09K 8/524 | 166/275 |
| 5,167,966 A * | 12/1992 | Green, II | C01D 13/00 | 424/715 |
| 7,618,928 B2 * | 11/2009 | Stokes | C10M 163/00 | 508/192 |
| 8,946,359 B2 * | 2/2015 | Siraux | B01J 4/001 | 526/64 |
| 2002/0113336 A1 * | 8/2002 | Cass | C04B 35/62227 | 264/187 |
| 2011/0114331 A1 * | 5/2011 | Van Den Berg | C10G 27/00 | 166/369 |
| 2011/0303410 A1 * | 12/2011 | Chang | C09K 8/58 | 166/268 |
| 2011/0308798 A1 * | 12/2011 | Chang | E21B 17/042 | 166/275 |
| 2013/0168089 A1 * | 7/2013 | Berg | E21B 43/16 | 166/270.1 |
| 2014/0014375 A1 * | 1/2014 | Boerrigter | E21B 43/16 | 166/402 |
| 2020/0032124 A1 * | 1/2020 | Trahan | B01F 7/00725 | |

OTHER PUBLICATIONS

Derwent Abstracts: DERWENT Acc—No. 2018-58827H of Patent document, CN 207628316 U Jul. 20, 2018, 3 paes. (Year: 2018).*

* cited by examiner

METHOD, PROCESS, APPARATUS AND CHEMICALS TO PRODUCE AND INJECT PARAFFIN TREATING COMPOUNDS

REFERENCE TO RELATED APPLICATIONS

This is a utility patent application claiming priority to U.S. Provisional Patent Application No. 62/740,787, filed on 3 Oct. 2018, entitled "Method, Process, Apparatus, and Chemicals to Produce and Inject Paraffin Treating Compounds." The contents of this provisional application are fully incorporated herein by reference.

FIELD OF INVENTION

The present invention is an apparatus and method that combines a carbon disulfide-releasing chemical with a low pH organic or inorganic acid to produce a carbon disulfide-containing fluid at or near the point of injection into a well production system that minimizes or eliminates the possible exposure of carbon disulfide to workers and the environment. In one particular embodiment, a positive displacement injection pump injects the carbon disulfide-containing fluid into a crude oil system for treating crude oil transmission lines and in downhole tubulars to remove paraffin deposits. The device uses a unique in-line motion mixer to mix two fluids. The device is electronically controlled locally and remotely with the system operating data displayed locally and transmitted remotely. The paraffin treating carbon disulfide-containing fluid and supplemental chemicals dissolve, disperse and remove paraffin deposits.

BACKGROUND OF INVENTION

This invention relates to the use of a method, a process, an apparatus and special chemicals to produce, inject and monitor the application of carbon disulfide-containing fluids. The apparatus efficiently combines carbon disulfide releasing chemicals in order to produce a carbon disulfide-containing paraffin dissolving chemical solvent for use in crude oil systems. More particularly, this invention relates to the chemical treatment of crude oil systems including: crude oil flow lines, pipelines, downhole production pumps, tubing and vessels. Carbon disulfide is effective at removing therefrom or preventing the forming of petroleum waxes commonly referred to as "paraffin deposits" or simply "paraffins." The term "paraffin" as used to describe this problem refers to the deposit of carbonaceous material which is not soluble or dispersible by the crude oil under the conditions where deposition occurs. The "paraffin" normally consists of high molecular weight paraffin hydrocarbons, both straight chain and branched, resins and asphaltic materials of undetermined nature, occluded oil and water, and possibly oil-wet sand. In consistency, the deposit may vary from a soft, sticky material, to one which is hard and brittle. Paraffin deposits range in color from white to brown to black.

Under the conditions of temperature, pressure, and crude oil composition occurring in the underground reservoir, the paraffin is typically in suspension or solution in the crude. As the oil flows to the surface, there is generally a reduction of temperature, pressure, and the amount of dissolved gases contained in the oil. Reduction of temperature and gas break-out are shown to be factors causing reduced solubility of the paraffin in the crude oil. Thus, as the crude containing paraffin rises to the surface and flows to storage tanks through conduits at low pressure or atmospheric pressure, the solubility of the paraffin may be reduced. Deposition of paraffin will begin at the point in the system where the temperature of the system falls below its cloud point, or if the surface temperature of the crude oil piping falls below the cloud point, and continue if there is a further drop in the solvent power of the crude oil for the paraffin. The severity of the deposition in subsurface or surface equipment, will depend on the amount of paraffin originally in the crude oil, the way pressure and temperature of the crude oil are reduced and other properties of the crude oil and of the paraffin.

The melting point of the paraffin is the principal factor influencing solubility in each solvent, the solubility decreasing sharply with increased melting point, as would be expected. For hydrocarbon solvents, the main factor which influences solvent power is shown to be the American Petroleum Institute ("API") gravity of the solvent, solvents of high API gravity being superior paraffin solvents, and solvents high in aromatic content.

Carbon disulfide is known to be one of the most effective solvents for dissolving paraffin of different compositions. However, use of carbon disulfide or carbon disulfide containing solvents in the field is difficult and hazardous because it is extremely toxic, odorous, flammable, and volatile. Carbon disulfide has a flash point of $-22°$ F., a boiling point of $115.3°$ F., and an ignition temperature in air of $257°$ F. Carbon disulfide is highly soluble in oil.

Notwithstanding the physical handling challenges associated with carbon disulfide, there are several industrial applications. Carbon disulfide is a globally produced chemical solvent with the largest percentage of carbon disulfide produced today being used as a major raw material for the manufacture of regenerated cellulose. The two major products manufactured from regenerated cellulose are viscose rayon and cellophane. A considerable amount of carbon disulfide is also used in manufacturing carbon tetrachloride. Carbon disulfide is also used in the cold vulcanization of rubber and in making rubber accelerators and resins. In agriculture, carbon disulfide was widely used as a fumigant to control insects in stored grain, normally when mixed with other solvents to reduce the fire hazard.

Carbon disulfide is recognized by the Environmental Protection Agency as a potential neurotoxin. Workers physically handling carbon disulfide without protective gloves, eye and respiratory protection may be exposed to levels which may result in nerve damage.

Understanding and recognizing the concerns in handling carbon disulfide there is a real need in the oil & gas industry and other industries for a safe efficient method and process for producing, delivering and injecting carbon disulfide containing solvent into paraffin containing crude oils to remove paraffin deposits. This invention provides a safe method and process to produce carbon disulfide without possible exposure of carbon disulfide to workers and the environment. This inventive process uses a unique apparatus at or near the point of injection into crude oil systems including: oil & gas flowing pipelines or into an oil & gas producing wells to dissolve and remove paraffin deposits from within pipelines, vessels, downhole tubulars, and oil/gas/water separation equipment. More particularly, this invention relates to a process method to produce carbon disulfide safely at or near the point of injection without the typical dangers associated with the physical transporting, conveying or handling of carbon disulfide or solvent products containing carbon disulfide. The process uses a unique apparatus that produces carbon disulfide-containing fluid solvent on demand, eliminating the need to store carbon disulfide or carbon disulfide-containing treating chemical products on location.

Traditional treatments of the paraffin containing crude oil to dissolve paraffin deposits include: 1) mechanical scraping, 2) hot oiling, 3) hot water, 4) continuous application of heat, 5) chemical solvent batch treatments, 6) continuous paraffin inhibitor/solvent treatment, and 7) combination treatments of mechanical or thermal techniques. Still another less widely used method is the use of high strength magnets or electromagnets positioned in line to allow paraffin-containing oil to flow through an intense magnetic field to disrupt the paraffin's tendency to agglomerate and stick to the pipe walls.

U.S. Pat. No. 2,300,348 discloses a method wherein oil is heated and pumped downhole to thermally dissolve paraffin and remove it from the surface of production tubing and sucker rods. Many variations upon this method have been discovered and employed in later years. This basic hot oiling method continues today with crude oil system operators using hot oil heating equipment to dissolve paraffin downhole and on the surface in crude oil systems. The hot oil method is subject to many dangerous handling conditions when heating up a volatile crude oil using a propane or diesel fired burner. With many paraffin conditions, it has been discovered how repeated hot oiling of paraffin tends to remove the paraffin with lower melt points leaving behind the higher melt point paraffin. The high melt point paraffin builds up deposits on the internal surfaces of crude oil systems and makes it very difficult to remove mechanically, chemically or by requiring crude oil systems to use hot oil at much higher temperatures in order to dissolve the high melt point paraffin.

Chemical dissolution of paraffin deposits requires the application of aromatic and/or aliphatic solvents that will effectively and efficiently dissolve the paraffin regardless of structure, size and melting point. The process requires much less energy compared with thermally melting the wax. Typical solvents include chemicals based on condensate light gas oil, xylene, toluene, terpenes, and carbon disulfide. These solvents are generally pumped in the crude oil system in a batch slug volume or in a continuous injection method to remove paraffin from pipelines. In U.S. Pat. No. 3,241,614 it teaches a process for removing paraffin accumulations by contacting with liquid mixture of solvent and a surfactant. Various hydrocarbon solvents are mentioned, as is carbon disulfide. U.S. Pat. No. 3,375,192 teaches about a mixture for cleaning oil wells which is composed of carbon disulfide and pentane. U.S. Pat. No. 3,402,770 teaches about a single base solvent which is used to dissolve flow-restricting paraffin in oil well equipment. The solvent solution disclosed comprises of an organic solvent with carbon disulfide disclosed as the preferred organic solvent for oil and asphalt. In U.S. Pat. No. 3,563,315 it teaches the use of carbon disulfide used alone or in combination with hydrocarbon solvents or even present in low concentrations will aid in the removal of paraffin deposits from pipe wall surfaces.

In U.S. Pat. No. 3,724,552 (Snavely, Jr.), therein is described the use of water-soluble chemical selected from a class consisting of thiocarbonates, dithiocarbonates, and xanthates. In this patent, the inventor relies upon inexact mixing of the carbon disulfide releasing chemicals along with the elevated downhole temperatures and naturally acidic conditions caused by acid gases downhole to liberate carbon disulfide from these water-soluble compounds. Once the carbon disulfide is liberated it works to remove paraffin deposits from formations.

In U.S. Pat. No. 5,053,149 (McElligott Jr. et al) it describes a process for dissolving wax, paraffin and/or sulfur deposits in oil or gas pipeline or well involves the use of an acid and a compound which liberates carbon disulfide upon contact with the acid, whereby the deposit is dissolved by the liberated carbon disulfide. I this invention the inventor relies upon the inexact mixing of the carbon disulfide releasing chemicals combining with the addition of an acid to lower the pH and initiate the chemical reaction to release the carbon disulfide. The presence of crude oil, produced water and natural gas create an unknown mixture which lowers the efficiency in the release of the carbon disulfide which may lead to lower overall paraffin removal efficiency by using this method.

In U.S. Pat. No. 5,076,358 (Kissel) it teaches the use of one or more salts of tri- and tetrathiocarbonic acid injected into petroleum-bearing formations to form carbon disulfide to dissolve paraffin and increase flow of oil from the formation. The inventor here relies upon the inexact mixing of two chemicals in the presence of crude oil, produced water and natural gas to initiate and carry forward a reaction to release carbon disulfide from a carbon disulfide releasing chemical in a oil bearing reservoir.

In Canadian patent application CA 2,184,240 (Kissel) it teaches solutions of dithiocarbamate salts, such as the sodium salts of N-methyl dithiocarbamate and N, N-dimethyl dithiocarbamate, can be used as admixtures with acids to provide a non-corrosive treatment for oil production systems. It discloses how carbon disulfide lowers the pour point of the crude oil, reduces pressures in crude oil flow pipelines, reduces oil/water separation problems, and increases crude oil yields. The inventor describes the use of carbon disulfide in oil bearing formations to improve the production of oil and does not disclose a method or process to apply the carbon disulfide fluid into a crude oil system downhole or on the surface.

A need exists for a system which produces carbon disulfide-containing fluid in a mobile or easily transported modular system, able to control a chemical reaction using a class of carbon disulfide-releasing water soluble chemical compounds consisting of trithiocarbonates, dithiocarbamates, thiocarbonates, xanthates and dithiocarbonates. When the carbon disulfide-releasing chemical compounds are mixed in the process with an acid, organic or inorganic, where the pH of the blended fluid is reduced to below 3.5, the release of carbon disulfide occurs. The process can be operated in a continuous or intermittent continuous batch flow. The method and process occur in the unique apparatus located at or near the point of injection into the crude oil system. The process apparatus controls the physical conditions of the reaction including the temperature of the process and the proper metering and blending of the chemical compounds to achieve high efficiency in the release of carbon disulfide for injecting into crude oil system.

SUMMARY OF INVENTION

The present invention is a device and a method that combines a carbon disulfide-releasing chemical with a low pH organic or inorganic acid to produce a carbon disulfide-containing fluid at or near the point of injection that minimizes or eliminates the possible exposure of carbon disulfide to workers and the environment. In one particular embodiment a positive displacement injection pump injects the carbon disulfide-containing fluid into a crude oil system for treating crude oil transmission lines and in downhole tubulars to remove paraffin deposits. The device uses a unique in-line motion mixer to mix two fluids. The device is electronically controlled locally and remotely with the system operating data displayed locally and transmitted remotely. The paraffin treating carbon disulfide-containing fluid and supplemental chemicals dissolve, disperse and remove paraffin deposits.

The present invention is inclusive of a method, a process, an apparatus and chemical products for treating paraffin deposits in oilfield crude oil handling equipment and tubulars by producing onsite a paraffin solvent to dissolve, disperse and remove from the crude oil system by.

The present invention teaches a method of producing the paraffin treating chemical carbon disulfide at or near a point of injection into crude oil handling equipment, crude oil transmission pipelines or downhole oil & gas producing well, collectively may be referred to hereinafter as simply "crude oil system."

The present invention is further inclusive of an electronic onsite monitoring system to monitor apparatus functions and overall system conditions which include monitoring the chemical level and report the volume of chemicals held in the feed storage tanks, meter the chemical volumes transferred from chemical storage tanks to apparatus, monitor system pressures, temperatures, and respond to out of specification conditions by issuing a local and remote message as well as activating shut down procedures remotely. The electronic monitoring system also meters chemical volumes injected into crude oil system and provides this information locally and remotely via an electronic signal and reporting on the internet. The safety controls made a part of the electronic onsite monitoring system provides for a safe and efficient handling of the carbon disulfide-containing fluid being produced and injected into the crude oil system.

The present invention optionally uses a supplemental addition of a separate paraffin solvent/dispersant/inhibitor for use in conjunction with the carbon disulfide-containing fluid in a continuous or in batch injection method. It is not uncommon for crude oil system operations to use co-solvents, co-surfactants and paraffin inhibitors in conjunction with paraffin dissolving chemicals. Carbon disulfide is industry recognized as one of the most effective paraffin dissolving chemicals for removing paraffin deposits in crude oil systems. Left untreated, paraffin deposits create flow restrictions and plugs in crude oil systems.

The present invention provides a method and process wherein a mobile, or easily transported chemical process apparatus is located at or near the point of injection in order to provide a local, safer method of producing and using carbon disulfide to treat paraffin deposits. The invention accomplishes this by using an apparatus capable of a continuous or batch method of producing the carbon disulfide-containing fluid as required by crude oil system operations which eliminates the need for keeping bulk volumes of carbon disulfide-containing paraffin treating chemicals onsite.

The present invention provides a method, an apparatus and chemicals that when combined under predetermined and controlled operating conditions is effective in producing a carbon disulfide-containing fluid for continuous or batch injection into crude oil systems. The carbon disulfide-releasing chemicals used in this invention are selected from a general class of chemicals consisting of thiocarbamates, thiocarbonates, dithiocarbamates, trithiocarbamates, thiocarbonates, and dithiocarbonates.

Other methods have previously been described and are available in the state of the art to produce and provide carbon disulfide for treating paraffin in crude oil systems, but such methods describe simply pumping a volume of carbon disulfide-releasing chemical along with an acid into the crude oil system in an unmetered method, relying on the combination of the carbon disulfide releasing chemical and acid to occur within the crude oil system rather than externally. The previous methods of combining carbon disulfide releasing chemicals within crude oil systems rather than externally provides an unsophisticated method lacking precision metering and without the benefit of local and remote electronic monitoring capabilities. The present invention improves the state of the art by realizing the combination of carbon disulfide-releasing chemicals can be carefully metered and controlled locally and remotely without interrupting the production operations or potentially exposing workers to the dangers of handling carbon disulfide on location.

BRIEF DESCRIPTION OF THE DRAWINGS

In the detailed description of various embodiments usable within the scope of the present disclosure, reference is made to the accompanying drawings.

DETAILED DESCRIPTION OF EMBODIMENTS

Before explaining the present apparatus and methods in detail, it is to be understood that the apparatus and methods are not limited to the particular exemplary embodiments and that it can be practiced or carried out in various ways. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concepts herein taught, and because many modifications may be made in the embodiments described herein, it is to be understood that the details herein are to be interpreted as illustrative and non-limiting.

Carbon disulfide reacts with N-nucleophiles that form nitrogen-carbon bonds. Compounds of amino and imino groups react, in the presence of a base, with carbon disulfide to produce dithiocarbamates. Dithiocarbamates have a wide range of uses and applications and are produced in great quantities throughout the world. General methods for their synthesis involve the reaction of an amine with and carbon disulfide with a base catalyst, such as sodium hydroxide. Aromatic dithiocarbamates are synthesized by simply mixing in equimolar ratio an amine such as diethylamine with carbon disulfide, using an aromatic halide such as benzyl chloride as a catalyst to form S-alkyl ditiocarbamate.

The present invention provides a system for producing carbon disulfide-containing fluids paraffin solvent locally at or near the point of injection for treating oil pipelines transporting paraffin containing crude oil. The chemical reaction combines a class of water-soluble chemical compounds including: thiocarbonates, thiocarbamates, dithiocarbonates, dithiocarbamates, trithiocarbonates, and trithiocarbamates. These carbon disulfide-releasing chemicals, when exposed to low pH (less than pH 3.5) from the mixing with an organic or inorganic acid, initiate the release of carbon disulfide from the carbon disulfide-releasing thio-compound. The carbon disulfide-containing fluid is then injected nearby into a crude oil system, flowline or oil production system.

The decomposition of dithiocarbonates to release carbon disulfide is a commonly known chemical reaction. It is disclosed in a research report published by the Department of Chemistry, Carleton University, Ottawa 1, Ontario, Canada in the journal Analytical Chemistry, Vol. 42, No. 6, May 1970, by researchers Serge J. Joris, Keijo I. Aspila and Chuni L. Chakrabarti titled, "Decomposition of Monoalkyl Dithiocarbamates." In this report, they disclose how the acid form of the dithiocarbamate molecule undergoes fast first order decomposition forming only carbon disulfide and an amine. The amines released can serve as corrosion inhibitors in the crude oil system to protect metal surfaces.

Classes of water-soluble compounds which decompose under ambient or elevated temperatures along with exposure to low pH (acidic) hydrolytic conditions to release carbon disulfide include thiocarbamates and thiocarbonates, including: dithiocarbamates, trithiocarbonates, dithiocarbonates, and trithiocarbamates. These chemical compounds are suited for use in this invention. These carbon disulfide-releasing chemicals are water-soluble and commonly used as water clarifiers, oil-in-water demulsifiers, corrosion and scale inhibition. Compounds found to be particularly suited for this process include: sodium dimethyldithiocarbamate, potassium dimethyldithiocarbamate, sodium diethyldithiocarbamate, potassium diethyldithiocarbamate, sodium trithiocarbonate, potassium trithiocarbonate monohydrate, disodium ethylenebisthiocarbonate and thiuram disulfide. Such compounds have been used for other purposes and their properties and method of preparing are well known. Dithiocarbonates, for example, have been used as fungicides and are produced in major amounts for the manufacture of rayon.

The system provided in this invention is able to produce a dilute carbon disulfide-containing fluid on demand, continuous or continuous intermittent batch method at or near the point of injection. The current invention method, process, apparatus and chemicals are capable of producing and injecting any volume of carbon disulfide-containing fluids into crude oil systems.

The system described herein combines carbon disulfide releasing chemicals with an organic or inorganic acid in a continuous or intermittent continuous batch method. The water-soluble carbon disulfide-releasing chemical may be subsequently blended in line with other treating chemicals such as paraffin solvents, paraffin dispersants and paraffin inhibitors before being injected into the crude oil system.

The organic or inorganic acid used in the chemical reaction serves to lower the pH of the chemical blend to below 3.5 which causes the release of carbon disulfide. Typical mineral acids which may be used in the present method are hydrochloric acid (HCl), hydrobromic acid (HBr), hydrofluoric acid (HF), sulfuric acid (H2SO4), sulfamic acid ($H_3NSO_3$) and phosphoric acid ($H_3PO_4$). In preferred embodiments, hydrochloric or phosphoric acids are utilized. In other embodiments, powerful acids may be blended so as to make them easier to handle, e.g., urea hydrochloride instead of pure HCl.

Typical strong organic acids which may be used in the present method and apparatus are sulfonic acids ($S(=O)_2$—OH, such as methane sulfonic acid ($CH_3SO_3H$) and para-toluenesulfonic acid ($CH_3C_6H_4SO_3H$), and carboxylic acids ($C(=O)OH$). Other strong organic acids may also be used, such as oxalic acid ($C_2H_2O_4$) and acetic acid ($CH_3COOH$).

The chemical compounds capable of releasing carbon disulfide are precursors of carbon disulfide, including salts of the entire thiocarbamate family, thocarbonate family, dithiocarbamates (e.g., disodium ethylenebisdithiocarbamate, and disodium hexadecamethylenbisdithio carbamate), may be used. Preferably, the compound is selected from the group consisting of salts of di-, tri- and tetra-thiocarbonic acids. More preferably, the compound is sodium dimethyldithiocarbamate. Methods for producing dithiocarbamates are disclosed in U.S. Pat. No. 3,724,552.

Aqueous solutions of the carbon disulfide liberating chemicals vary in concentration depending upon the particular compound used, the temperature, and strength of organic or inorganic acid used to create the carbon disulfide releasing action.

The treatment concentration of the carbon disulfide downstream of the carbon disulfide production process may vary with in concentration and volume of carbon disulfide injected into the crude oil system. The treatment concentration of carbon disulfide injected into the flowline or downhole is dependent upon the type, volume and physical characteristics of the paraffin in the crude oil and the degree of paraffin deposition already deposited.

An object of the present invention is to provide a mobile, modular or skid-mounted, automated chemical injection system for producing and injecting the carbon disulfide-containing fluid at or near the point of injection into crude oil system. The chemical injection apparatus can inject a predetermined amount of the chemical into the crude oil system with and without the co-injection of flushing liquids or supplemental chemical treatment. The flushing or displacement fluid used in this invention can be oil or water from production system or may be obtained from another source. The process and chemical injection/reaction apparatus makes use of readily available mechanical elements which are fabricated in a manner so as to allow for continuous or intermittent continuous batch injection of carbon disulfide-releasing chemical and acidic solution into the in-line chemical blender/reactor. The process apparatus makes use of two or more positive displacement chemical injection pumps in order to pump the carbon disulfide-releasing chemical along with the organic or inorganic acidic solution into the in-line blender/reactor. The two streams of chemical are combined head of or into the in-line motorized motion mixer to cause the reaction of releasing the carbon disulfide-containing fluid then flowing into crude oil system via a chemical conduit.

The invention further provides the use of an in-line motion mixer rather than using an in-line static mixer. The combining of two or more chemicals using an in-line motion mixer is more complete and offers improved mixing of the two or more liquids in a more immediate manner. The in-line mixer is a cylindrical device fitted on one end with a magnetic coupling used to rotate an internal blend shaft and sealed on the opposite end with an insert fitted with a high-pressure seal design intended to withstand injection pressures up to 1,500 psi. The magnetic coupling makes use of high power rare earth permanent magnets arranged in a manner so as to provide an induced magnetic force used for torque transfer. The main purpose of the magnetic coupling is to rotate the internal mixer shaft assembly and physically separate the two elements of the motor system, placing magnet discs on the electric motor shaft and a conductor assembly on the blend shaft. Motor torque is transferred to the load across an air gap. The use of a magnetic coupling device eliminates the potential for leakage of any of the chemical components from within the process mixing apparatus and eliminates the possibility of exposure of carbon disulfide or other chemicals to workers and the environment.

The invention provides a supplemental, optional method to separately combine carbon disulfide-releasing chemical and acid solution continuously through an in-line flow-through ultrasonic reactor. The ultrasonic flow-through reactor may also be used downstream of the in-line motion mixer to accelerate and improve reaction efficiency. The ultrasonic flow-through reactor will apply a high-energy sonic force into the fluid flowing through it accelerating and intensifying the release of carbon disulfide from the carbon disulfide-releasing chemicals.

Paraffin deposits can occur in crude oil systems at any ambient temperature. The paraffin problems are typically worse during colder ambient climates due to the cooling of the crude oil system piping increasing the tendency for paraffin to deposit onto the walls of flowlines and crude oil transmission lines. The system of this invention uses heating devices to maintain a minimum temperature of up to 80° F. (27° C.) of feed chemicals in chemical storage containers located near process apparatus. A heating device is used to heat the chemical in the chemical conduit upstream of the in-line motion mixer up to 122° F. (50° C.). The elevated temperature aids in reducing the viscosity of the chemical components improving the blending of the two chemicals in the in-line motion mixer and increases the reaction efficiency in releasing carbon disulfide from the carbon disulfide-containing chemical.

Another object of the invention is a chemical treating monitoring system adapted for various crude oil treating applications in which the process apparatus injection pump is connected to crude oil systems via conduit, and provides for the remote and local continuous electronic monitoring of apparatus operating conditions and crude oil system conditions.

A further object of the invention is to locally and remotely communicate electronically the chemical levels, process conditions and monitoring data from multiple remote application locations to one or more monitoring location.

Figure 1:
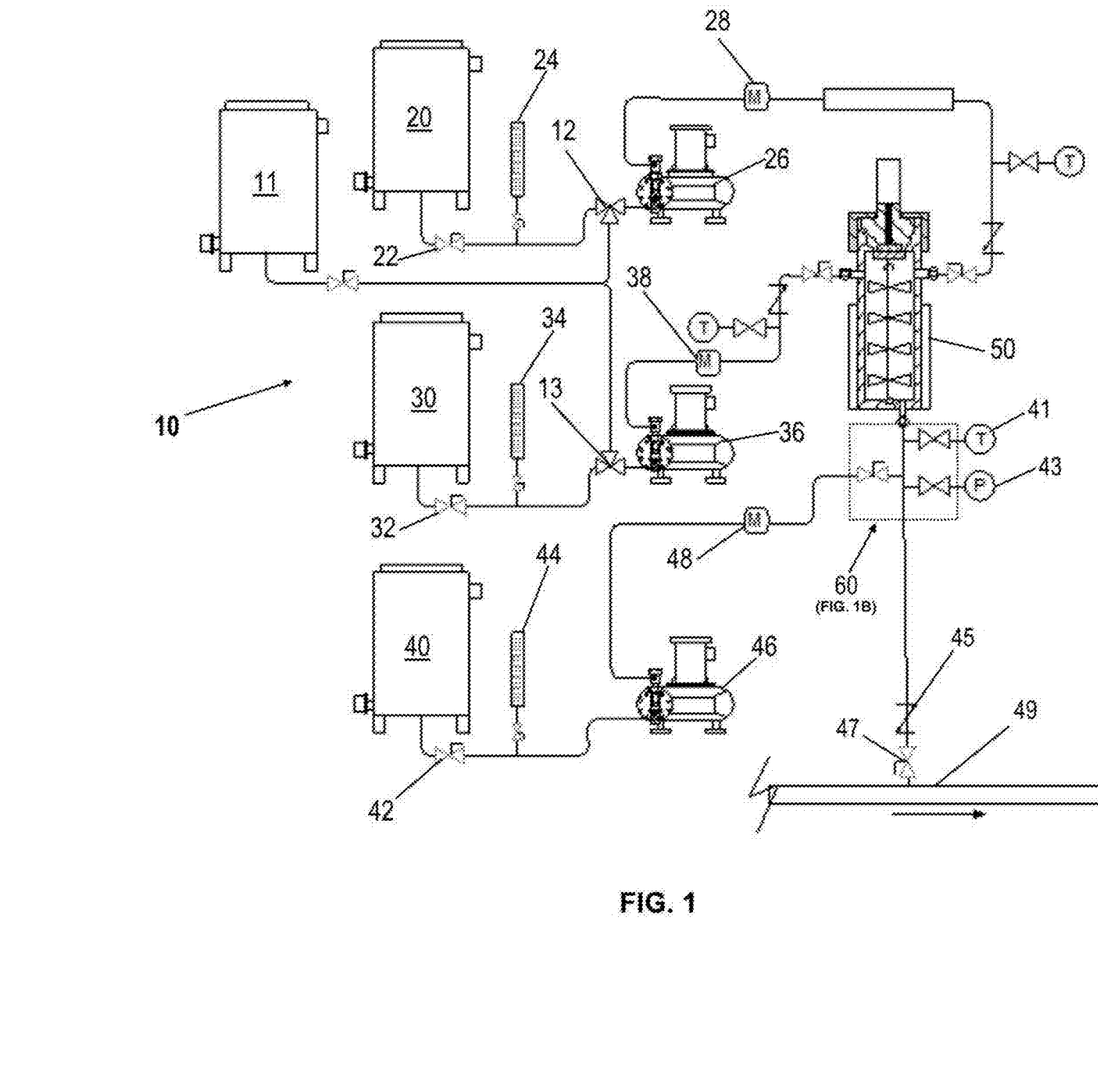
FIG. 1 depicts an overall diagram of an embodiment of a reactor system.

Referring first to FIG. 1, a diagrammatic view of an embodiment of the carbon disulfide generating apparatus 10 comprises two chemical feed tanks 20 and 30 connected via a stainless-steel conduit to the in-line motion mixer 50. The stainless-steel conduits connecting the feed tanks 20, 30 with the in-line motion mixer 50 are fitted with manual operating valves 22, 32 respectively, as well as electrically actuated solenoid valves 24, 34 respectively, to discontinue flow of chemicals to the in-line motion mixer 50. The chemical flow from each feed tank 20, 30 is pumped into the in-line motion mixer 50 and into the crude oil system using positive displacement chemical transfer pumps 26, 36, respectively, and are directed through in-line flow meters 28, 38, respectively, with the electronic output of the flow meters 28, 38 recorded by onboard process controller and electronically transmitted to offsite monitoring points.

Additionally, as shown in FIG. 1 the invention incorporates a water holding tank 11 to feed supply of water to the two or more chemical transfer pumps 26, 36. In the event of a planned or unplanned shut down of the process the onboard electronic controller will direct three-way valves 12, 13 to close off flow of the chemical from feed tanks 20, 30 (respectively) and open the flow of water from the water storage tank 11 into the suction of the transfer pumps 26, 36. The flow of water into the chemical transfer pumps 26, 36 and then subsequently into the downstream chemical conduit and in-line motion mixer 50 is intended to displace all chemicals used in the process and evacuate the system of any residuals. Once a displacement equal to at least two times resident volume is achieved the chemical transfer pumps 26, 36 are turned off and the process unit is free of chemical residual for workers to inspect, repair or replace elements of the process without exposure to chemical compounds used in the process.

The apparatus 10 also acts as a chemical injection manifold capable of providing for injection of two or more chemicals into a single injection point. In practice, since access to inject chemicals may be through limited injection points, an injection manifold 60 allows for multiple chemical injections through a single access point. It can also be beneficial to inject additional treating chemicals at or near the same point of injection as the carbon disulfide-containing paraffin solvent injection. In an embodiment, a supplemental feed tank 40 is connected to the apparatus 10 downstream from the in-line motion mixer 50. As with the other feed tanks, feed tank 40 is controlled by manual valve 42 and solenoid valve 44, drawn into the conduits by supplemental transfer pump 46, and monitored by flow meter 48.

Figure 1B:
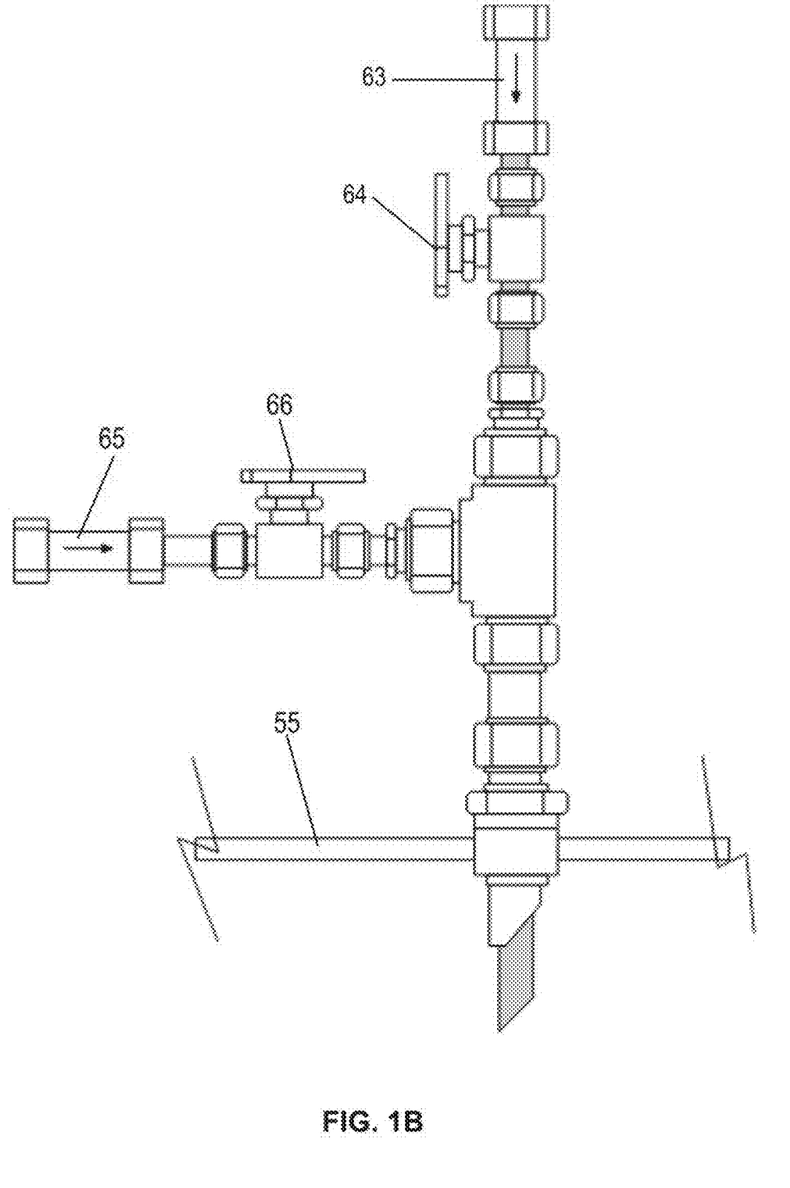
FIG. 1B depicts a zoomed-in version of the manifold portion of the reactor system of FIG. 1

A detailed view of the injection manifold portion 60 of the apparatus 10 is depicted in FIG. 1B, which shows a first conduit 63 receiving the mixed carbon disulfide solution from the in-line motion mixer 50 (not shown) and a second conduit 65 receiving the supplemental treating chemicals from the supplemental feed tank 40 (not shown) feeding into flowline 49. Both conduits 61, 65 can be optionally closed off by valves 64, 66, respectively, if it is desired to inject only the carbon disulfide solution or only the supplemental treating chemicals.

In an embodiment, a paraffin dissolving and dispersing chemical co-solvent and surfactant blend is used to enhance the performance of carbon disulfide-containing fluid injected into the crude oil system. A preferred blend for use with the present invention comprises a mixture of an aromatic solvent, a non-aromatic solvent, and an oil-soluble, water-dispersible surfactant.

One of the solvents is substantially pure, mononuclear, aromatic hydrocarbon which may be substituted at one or more positions with a lower alkyl group having from about 1 to about 4 carbon atoms and isomers thereof. Representative hydrocarbon solvents which may be used in the composition of the present invention include benzene, toluene, xylene, cumene, ethyl benzene, propyl benzenes, butyl benzenes, ethyl toluenes, and the like.

The non-aromatic solvent component of the composition of the blend is a saturated linear or cyclic hydrocarbon or mixture thereof. Examples of the saturated aliphatic and/or alicyclic hydrocarbon solvents utilized in the composition of the present invention naphtha, cyclohexane, decalin, pentane, heptane, octane, cyclooctane, cycloheptane, olefinic ester solvents, methyl-9-dodecenoate, methyl-9-decenoate, D-Limonene; dipentene, and the like.

Anionic surfactants used in this invention include aryl and alkyl aryl sulfonates such as alkylbenzene sulfonate, linear alkylbenzene sulfonates, sodium tetrapropylene benzene sulfonate, sodium dodecylbenzene sulfonate, benzene-, toluene-, xylene-, and cumene sulfonates, lignin sulfonates, petroleum sulfonates, paraffin sulfonates, secondary n-alkanesulfonates, olefin sulfonates, alkylnaphthalene sulfonates, n-acyl-n-alkyltaurates, sulfosuccinate esters, isothionates, alkyl sulfates having the formula $R_1OSO_3R_2$. Wherein $R_1$ and $R_2$ are defined above, such as lithium dodecyl sulfate, sodium dodecyl sulfate, potassium dodecyl sulfate, and sodium tetradecyl sulfate, alkyl sulfonates having the formula $R_1SO_3R_2$. Wherein $R_1$ and $R_2$ are as defined above, such as sodium lauryl sulfonate, sulfated and sulfonated amides and amines, sulfated and sulfonated esters such as lauric monoglyceride sodium sulfate, sodium sulfoethyl oleate, and sodium lauryl sulfoacetate, sulfuric acid ester salts such as sulfated linear primary alcohols, sulfated polyoxyethylenated straight chain alcohols and sulfated triglyceride oils, phosphoric and polyphosphoric acid esters, perfluorinated carboxylic acids, and polymeric anionic surfactants such as alginic acids.

A preferred anionic surfactant marketed commercially is Isopropylamine Alkylaryl Sulfonate, supplied by AkzoNobel as the Witconate 93S. Another preferred commercial anionic surfactant is Isopropylamine Dodecylbenzenesulfonate, sold by AkzoNobel as Witconate P-1059. Another commercial anionic surfactant is sold by Stepan as Ninate 411 is a Isopropylamine salt of branched alkylbenzene sulfonic acid. The surfactants are used alone or with co-surfactants in solvent blend at 5% up to 35% by volume addition, more preferably at 8% to 15% by volume in the solvent blend.

Returning now to FIG. 1, the reacted chemical admixture flows via a stainless-steel conduit out of the in-line motion mixer 50 and is directed into the nearby crude oil flowline 49. The positive displacement chemical injection pump is capable of pumping the chemicals at pressures sufficient to overcome the crude oil system pressure.

Downstream of the in-line motion mixing apparatus 50 the stainless-steel chemical conduit is fitted with a sample valve 41 to periodically test and evaluate the efficiency of the chemical reaction to produce a carbon disulfide-based fluid. An in-line pressure sensor 43 is fitted in the stainless-steel conduit downstream of the sample valve and upstream of the in-line check valve 45. The in-line check valve 45 is upstream of an isolation valve 47 which is fitted onto the crude oil flowline 49.

Figure 2:
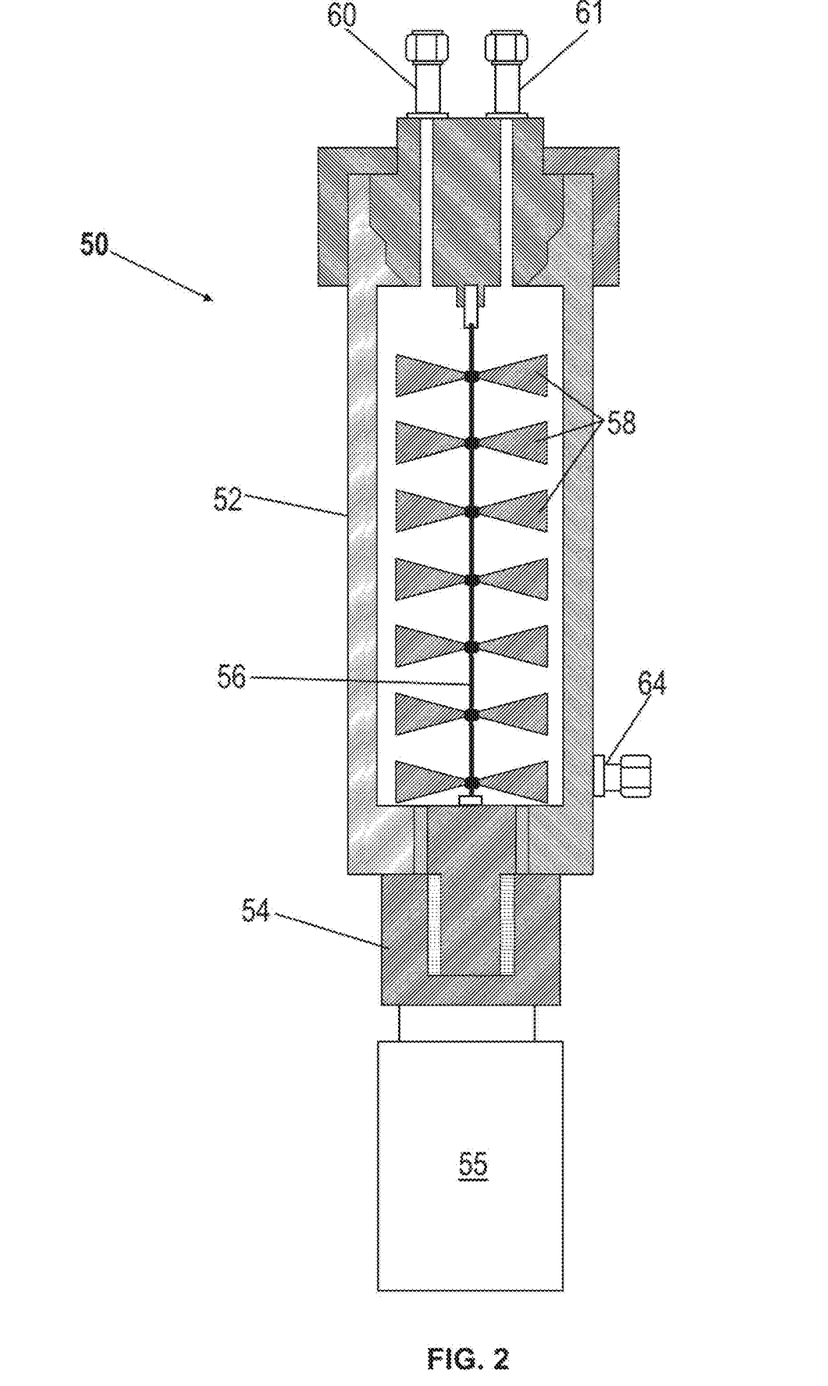
FIG. 2 depicts a detailed view of an embodiment of the in-line motion mixer component.

Referring now to FIG. 2, a diagrammatic detailed view of the in-line motion mixer 50 is depicted. It is used to combine two or more chemical additives to initiate a chemical reaction intended to release carbon disulfide solvent from a carbon disulfide-containing chemical exposed to a low pH influence of an organic or inorganic acid. The in-line motion mixer 50 is constructed of a welded stainless-steel cylinder 52 fitted on one end of the cylinder with a magnetic drive coupling 54 connecting an explosion-proof electric motor 55 to an internal magnet mixer shaft 56 fitted with blending mixer blades 58. The chemicals enter the in-line motion mixer 50 via two or more ports 60, 61, where they are exposed to a mixing action by the mixer shaft 56 and blades 58, and then exit the mixing chamber through an exit port 64 connected to a chemical conduit (not shown). The in-line mixer apparatus can be isolated manually by an inlet valve mounted in line on the two inlet chemical conduits 60, 61

The in-line motion mixer 50 combines the carbon disulfide-releasing chemicals with an acid in order to produce a carbon disulfide-containing fluid. The reaction process releases carbon disulfide into a fluid by combining two or more chemicals in an efficient and effective manner. The key aspect of this invention is how it can efficiently produce the carbon disulfide-containing fluid on-site at or near the point of injection without any need for workers to handle carbon disulfide or store carbon disulfide or carbon disulfide-containing paraffin treating chemicals for injection in a crude oil system. In the invention, the only carbon disulfide present will be in the apparatus 10 or the chemical conduit traveling from the apparatus 10 to the point of injection into a crude oil flowline 49.

Typically, when two or more chemicals require mixing in a conduit it is common to use an in-line static or motionless mixer. Static mixers are motionless mixing devices that allow for the in-line continuous blending of fluids within a pipe. The static mixer must rely upon the energy of the flow stream to generate consistent and reliable mixing. The consistency of reaction is greatly improved by using an in-line motion mixer 50. The use of a magnetic coupling 54 avoids the potential of any carbon disulfide or other chemicals leaking and exposing workers and the environment to hazardous chemical agents. The lack of a seal shaft using a packing or elastomeric seal avoids chemical incompatibility of seal material and leakage.

Figure 3:
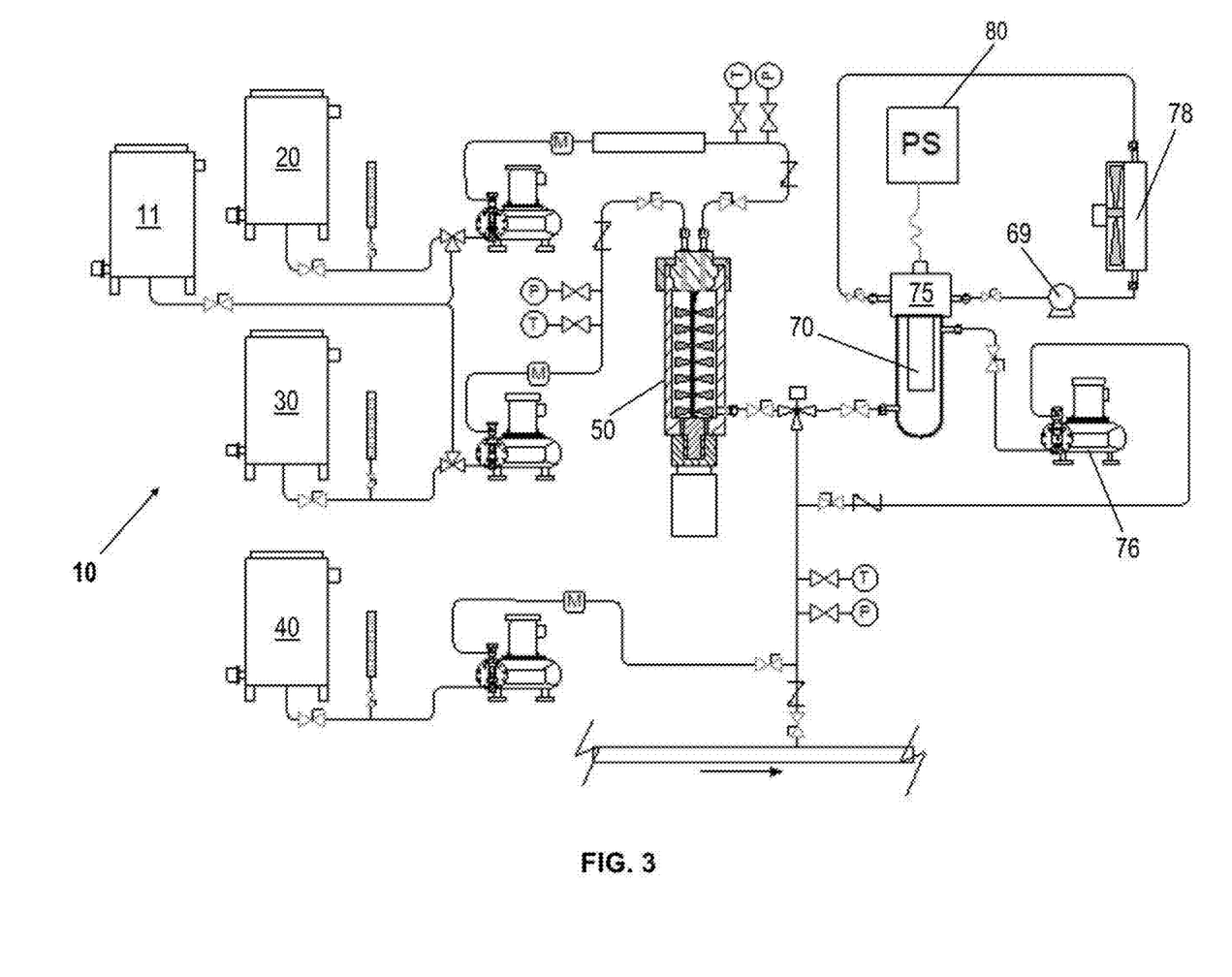
FIG. 3 depicts an overall diagram of another embodiment of a reactor system including an ultrasonic reactor component.

Referring now to FIG. 3, a diagrammatic view of an embodiment of the carbon disulfide generating apparatus 10 similar to that shown in FIG. 1 is depicted with the addition of a flow through ultrasonic reactor 70. The ultrasonic reactor 70 is depicted mounted downstream of the in-line motion mixer 50 so as to enhance the release of carbon disulfide from the reaction, but it may also be mounted upstream from the in-line motion mixer so as to receive flow from the two feed chemicals 20, 30. The chemicals, either mixed or unmixed, are drawn into ultrasonic reactor 70 by means of an ultrasonic reactor pump 76 which provides flow through.

Figure 4:
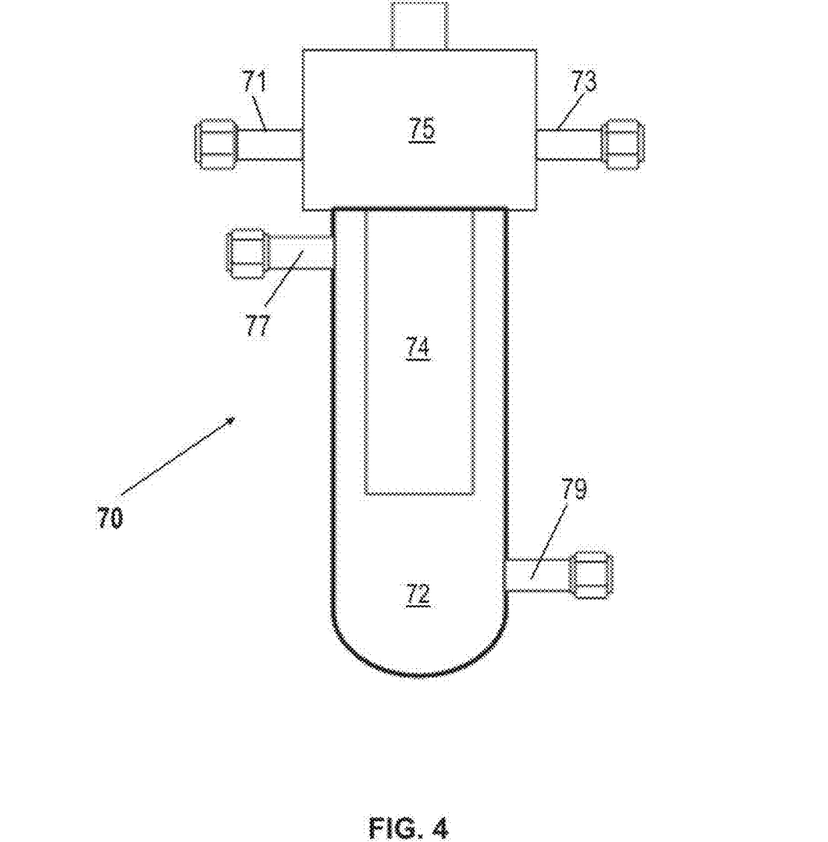
FIG. 4 depicts a detailed view of an embodiment of the ultrasonic reactor component.

Ultrasonic reactor is cooled by an independent fluid cooling system comprising pump 69 and cooler 78, described with more detail in FIG. 4. The cooling fluid can be comprised of a water/glycol blend pumped from an onsite water storage tank into cooler 78, which may be an in-line air/liquid fan-assisted cooling unit or radiator that reduces the heat from the cooling fluid to near ambient temperatures before circulating back into the system.

Referring to FIG. 4, diagrammatic view of a flow-through ultrasonic reactor 70 is depicted. Ultrasonic reactor 70 intensifies the acidification reaction releasing carbon disulfide from the acidification of the carbon disulfide-releasing chemicals. The ultrasonic reactor system is designed with a reaction chamber 72 for fluids to flow in and experience high energy ultrasonic energy. The use of ultrasonic energy is also referred to as used as a sono-chemistry process. The reaction enhancements arise from the ability of the reactor chamber to direct all treated liquid chemical through the highly active ultrasonic cavitation region located near the surface of one or more ultrasonic horns. The ultrasonic horn 74 is engineered to significantly increase the longevity and its output surface area, thereby increasing the total size of the active cavitation region. The horn is used to amplify the transducer's vibration amplitude.

The ultrasonic reaction chamber 72 is optionally fitted with a liquid cooling jacket 75 where cooling fluid is pumped across the transducer head of the ultrasonic horn via liquid conduit ports 71 (entry), 73 (exit), cooling the electronics. The reaction chemicals flow into the reaction chamber via conduit port 77 and exit the reaction chamber via conduit port 79. The transducer head (not visible behind cooling jacket 75) of the ultrasonic horn 74 is connected via an electrical cable to a power unit 80 (depicted in FIG. 3), where the frequency and amplitude of the ultrasonic horn is controlled. The ultrasonic flow through reactor is monitored locally and remotely using electronic sensors to manage unit operations.

The mechanism causing sonomechanical effects in liquids is the phenomenon of acoustic cavitation. The cavitation results in the enhancement of the chemical activity in the liquid. The sound waves propagate through a liquid at ultrasonic frequencies with a wavelength that is significantly longer than the bond length between atoms in does not liquid molecules. Therefore, it does not affect the vibrational energy of the bond, and cannot directly increase the internal energy of a molecule. Instead, sonochemical effects arise from acoustic cavitation, the formation, growth, and implosive collapse of a bubble in a liquid. Ultrasonic horns transmit ultrasonic energy into a solution.

The ultrasonic horn 74 transmits ultrasound radiation substantially uniformly throughout the reaction chamber. The ultrasonic horn 74 is hollow and is constituted by a cylinder having an empty inner chamber at its core defining a resonance chamber which is cylindrical. The dimensions of the ultrasonic horn 74 and the output control setting determine the amount of the amplitude (vibration movement of horn) and degree of ultrasonic activity in the liquid. In general, the smaller the tip diameter, the higher the amplitude, and vice versa. In this device, the amplitude can vary from 1 to 100 micrometers. The wavelength is calculated by the sound velocity and the frequency.

It has been observed that ultrasound can greatly enhance chemical reactivity, by as much as a million-fold, effectively acting as a catalyst by exciting the atomic and molecular modes of the system (such as vibrational, rotational, and translational modes). If solids are used as catalyst or reactants the ultrasonic waves break up the solid pieces from the energy released from the bubbles created by cavitation collapsing around them. This gives the solid reactant a larger surface area for the reaction to proceed over, increasing the observed rate of reaction.

As shown in FIG. 3, the blended chemical admixture flows out of the in-line motion mixer into the ultrasonic reactor chamber 70 where it encounters a reaction environment driven by an ultrasonic frequency of varying amplitude and residence time. The cooling jacket 75 regulates the increase in temperature created by the effect of the ultrasonic reaction.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention claimed is:

1. A system for in-line mixing and injection of paraffin treatment solutions comprising:
   a first feed tank containing a precursor salt and selectively in communication with a first conduit;
   a first positive displacement pump in line with the first conduit;
   a second feed tank containing an acid and selectively in communication with a second conduit;
   a second positive displacement pump in line with the second conduit;
   an in-line motion mixer selectively in communication with the first conduit and second conduit, wherein the in-line motion mixer combines the precursor salt and the acid to form a carbon disulfide solution and release it into an exit conduit; and
   an injection manifold which receives the carbon disulfide solution from the exit conduit and releases it into a flowline.

2. The system of claim 1, wherein the precursor salt comprises a thiocarbonate, thiocarbamate, dithiocarbonate, dithiocarbamate, trithiocarbonate, trithiocarbamate, or combinations thereof.

3. The system of claim 1, wherein the acid has a pH below 3.5 and comprises a hydrochloric acid, urea hydrochloride, hydrofluoric acid, hydrobromic acid, sulfuric acid, sulfamic acid, phosphoric acid, sulfonic acid, carboxylic acid, oxalic acid, acetic acid, or combinations thereof.

4. The system of claim 1, further comprising a water tank and water conduit, wherein the water conduit is in selective communication with the first conduit and the second conduit.

5. The system of claim 1, wherein the selective communication of the first feed tank and the second feed tank comprises an electrically actuated solenoid valve, a manually actuated valve, or a combination thereof.

6. The system of claim 5, wherein the first conduit and second conduit further comprise a first flow meter and second flow meter, respectively.

7. The system of claim 6, wherein the electrically actuated solenoid valve is actuated by means of an onboard process controller, and wherein the output of the first flow meter and second flow meter is recorded by the onboard process controller.

8. The system of claim 7, wherein the onboard process controller further transmits the status of the valves and the flow meter output to an off-site monitoring station.

9. The system of claim 1, further comprising:
   a supplementary feed tank containing a co-solvent blend and selectively in communication with a supplementary conduit; and
   a supplementary positive displacement pump in line with the supplementary conduit,
   wherein the injection manifold joins the supplementary conduit and the exit conduit prior to flowline release.

10. The system of claim 9, wherein the co-solvent blend comprises:
    an aromatic solvent comprising a mononuclear hydrocarbon having an alkyl group substitution;
    a non-aromatic solvent comprising a saturated aliphatic or alicyclic hydrocarbon; and
    an anionic surfactant comprising an aryl or alkyl aryl sulfonate.

11. The system of claim 1, wherein the in-line motion mixer comprises a stainless steel metallic cylinder housing a mixing shaft, the mixing shaft comprising a plurality of mixing blades.

12. The system of claim 11, wherein the magnetic mixing shaft is rotated by a magnetic drive coupling transmitting torque through the cylinder housing from an external electric motor.

13. The system of claim 1, further comprising an ultrasonic reactor in selective communication with the in-line mixer, wherein the ultrasonic reactor causes fluid cavitation to further release carbon disulfide.

14. The system of claim 13, wherein the ultrasonic reactor comprises a reaction chamber with an ultrasonic horn controlled by a transducer head.

15. The system of claim 14, wherein the ultrasonic reactor further comprises a cooling jacket surround the transducer head, the cooling jacket in fluid communication with an independent cooling loop.

16. The system of claim 13, wherein the ultrasonic reactor is located downstream of the in-line mixer, and upstream of the injection manifold.

17. The system of claim 13, wherein the ultrasonic reactor is located downstream of the first and second conduits, and upstream of the in-line mixer.

* * * * *